United States Patent [19]

Suzuki

[11] Patent Number: 5,412,610
[45] Date of Patent: May 2, 1995

[54] SERIAL DATA TRANSFER DEVICE

[75] Inventor: Katsunori Suzuki, Itami, Japan

[73] Assignee: Mitsubishi Denki Kabushiki Kaisha, Tokyo, Japan

[21] Appl. No.: 267,179

[22] Filed: Jun. 28, 1994

[30] Foreign Application Priority Data

Jun. 29, 1993 [JP] Japan .................. 5-158830

[51] Int. Cl.$^6$ .................................. G11C 7/00
[52] U.S. Cl. .................. 365/219; 365/221; 365/189.07
[58] Field of Search ........... 365/210, 220, 221, 189.01, 365/189.07

[56] References Cited

U.S. PATENT DOCUMENTS

| | | | |
|---|---|---|---|
| 4,864,543 | 9/1989 | Ward et al. | 365/221 |
| 4,891,788 | 1/1990 | Kreifels | 365/221 |
| 5,122,988 | 6/1992 | Graeve | 365/219 |
| 5,255,238 | 10/1993 | Ichige et al. | 365/189.07 |
| 5,343,439 | 8/1994 | Hoshino | 365/189.07 |

OTHER PUBLICATIONS

WEITEK XL-8220 Processor Data Book, Preliminary Data, Mar. 1990.

Motorola User's Manual Integrated Processor MC68332, Oct. 1991, pp. 120–121.
"M66230P/FP, A$^2$RT (Advanced Asynchronous Reciever & Transmitter)" Mitsubishi Simiconductor Circuit <Digital ASSP> May 1989, pp. 2-35~2-47.

Primary Examiner—Joseph A. Popek
Assistant Examiner—Tan Nguyen
Attorney, Agent, or Firm—Lowe, Price, LeBlanc & Becker

[57] ABSTRACT

A serial data transfer device has a FIFO memory for storing plural parallel data, a status register for indicating the actual number of residual data in the FIFO memory, a set register for arbitrarily setting the number of residual data in the FIFO memory, and a comparison circuit for comparing the indication value of the status register with the value of the set register. The indication value of the status register which indicates the actual number of residual transmit data (or residual receive data) in the FIFO memory is compared with the value of the set register in which a specific number of residual transmit data (or residual receive data) in the FIFO memory is set. Only when the number of residual transmit data (or residual receive data) in the FIFO memory is decreased (or increased) to the predetermined number of data, an interrupt signal is issued to a CPU.

6 Claims, 13 Drawing Sheets

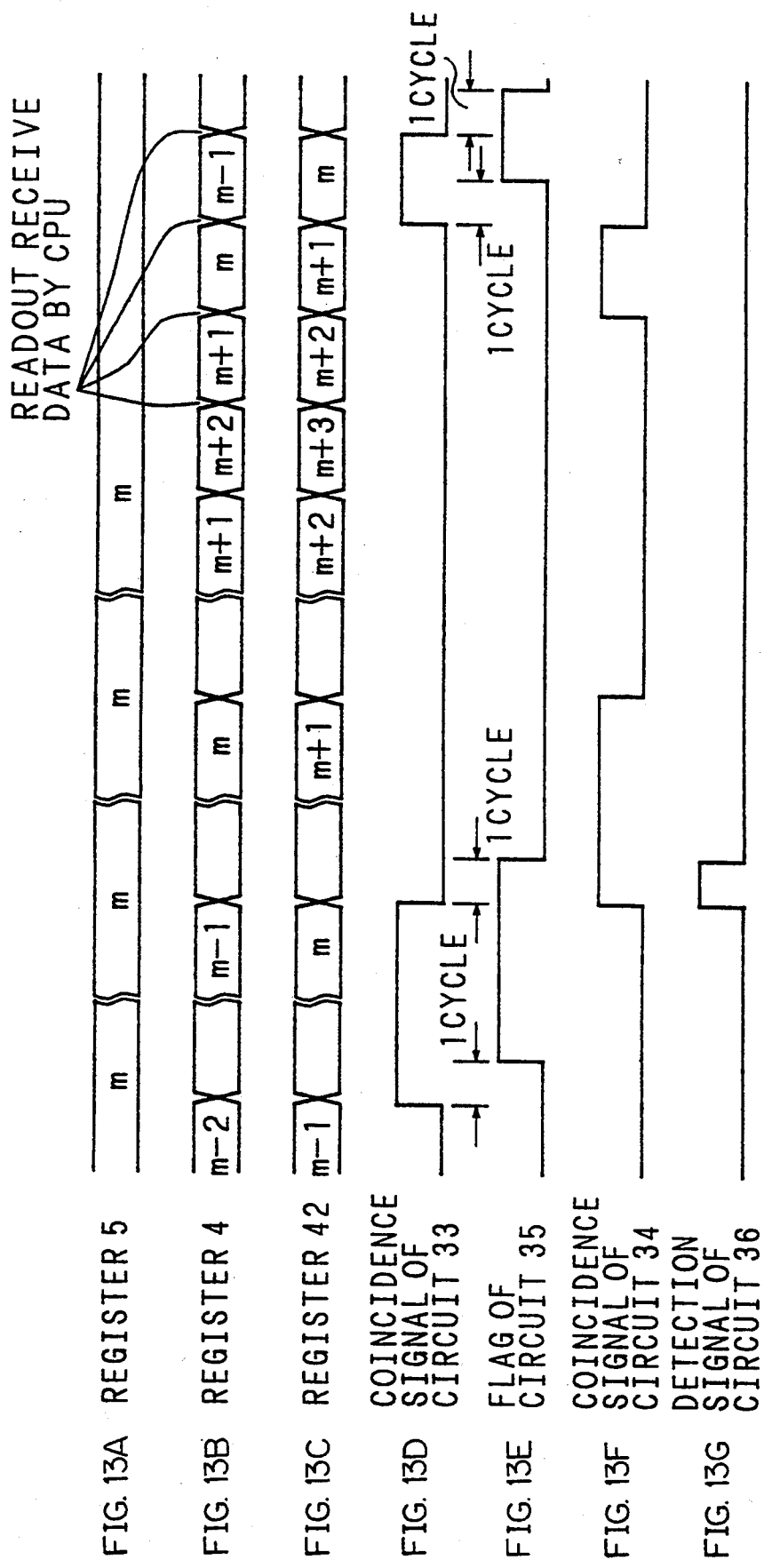

SERIAL DATA TRANSFER DEVICE

BACKGROUND OF THE INVENTION

1. Field of the Invention

The invention relates to a serial data transfer device which conducts the transmission and reception of serial data, and particularly to a serial data transfer device having a FIFO memory which can store plural transmit data and receive data.

2. Description of Related Art

In order to continuously transfer serial data, a prior art serial data transfer device comprises a memory which can store plural transfer data. As such a memory, a FIFO memory having the first-in first-out function or pushup storage function is used.

FIG. 1 shows a prior art example which is a serial data transfer mechanism used in a data processor (type MC68332) produced by Motorola Inc.

In FIG. 1, the reference numeral 80 designates a data serializer which converts a serial data inputted from the outside into a parallel data and outputs the parallel data to a RAM 79, and which receives a parallel data written from the outside into the RAM 79, converts the parallel data to a serial data, and outputs the serial data to the outside. The RAM 79 stores parallel data from the data serializer 80, and outputs the parallel data to the outside. Furthermore, the RAM 79 stores parallel data inputted from the outside, and outputs the parallel data to the data serializer 80.

The reference numeral 71 designates a cue pointer indicating the number of entries in which data are stored in the RAM 79. The cue pointer 71 outputs the number of the entries to an address register 78 and a comparator 72. The address register 78 outputs the number of entries to the RAM 79. The reference numeral 73 designates an end cue pointer indicating the number of the entries in the RAM 79 at the time when the transfer in the RAM 79 is completed. The comparator 72 compares the output value of the cue pointer 71 with the set value of the end cue pointer 78. When the two values coincide with each other, the comparator 72 outputs an interrupt signal.

The reference numeral 81 designates a clock generator which generates a clock signal SCK for data sampling or sending. A status register 74 for setting a transmission/receive completion flag, an error flag, etc., a control register 75 for controlling the transmission/reception permission, and a delay counter 76 for delaying the generation of the clock signal SCK in the clock generator 81 are connected to a control PLA 77.

Hereinafter, the interruption in the receiving operation in the prior art serial data transfer device having such a configuration will be described.

A serial data inputted from the outside is converted into a parallel data by the data serializer 80, and then stored in the RAM 79. The final absolute address at which the transfer is to be completed is previously written into the end cue pointer 73. Each time the transfer is completed, the comparator 72 compares the value of the cue pointer 71 with that of the end cue pointer 73. When the two values coincide with each other, a receive completion flag is set, and an interrupt signal appears.

As described above, according to the prior art example, in a transfer process of receiving (or transmitting) plural serial data, the interrupt signal doesn't appear until the receive (or transmission) is completed. In other words, there is a problem in that, in a transfer process of receiving (or transmitting) plural serial data, particularly, in the course of a continuous transfer, the interrupt signal can't be appeared at the receive (or transmission) completion of an arbitrary number of data.

SUMMARY OF THE INVENTION

It is the primary object of the invention to provide a serial data transfer device which can supply transmit data or receive data without discontinuing the transmission transfer or reception transfer, or conduct a continuous transfer.

The serial data transfer device of the invention is a device for converting a parallel data into a serial data or a serial data into a parallel data, and for transferring a serial data, and comprises a FIFO memory for storing plural parallel data, a status register for indicating the actual number of residual data in the FIFO memory, a set register for arbitrarily setting the number of residual data in the FIFO memory, and a comparison circuit for comparing a value of the status register with a value of the set register.

The value of the status register which indicates the actual number of residual transmit data in the FIFO memory is compared with the set value of the register which sets a specific number of residual transmit data in the FIFO memory. Only when the number of residual transmit data in the FIFO memory is decreased to the predetermined number of data, an interrupt signal appears.

On the other hand the value of the status register which indicates the actual number of residual receive data in the FIFO memory is compared with the set value of the register which sets a predetermined number of residual receive data in the FIFO memory. Only when the number of residual receive data in the FIFO memory is increased to the predetermined number of data, an interrupt signal appears.

Furthermore, the serial data transfer device has the following functions: The indication value of the status register is compared with the value of the set register, and a coincidence signal appears any time the two values coincide with each other. An interrupt signal appears only when the number of residual data in the FIFO memory becomes greater than or less than a predetermined number of data.

The above and further objects and features of the invention will more fully be apparent from the following detailed description with accompanying drawings.

BRIEF DESCRIPTION OF THE DRAWINGS

FIG. 13 is a timing chart of Embodiment 6.

DESCRIPTION OF THE PREFERRED EMBODIMENTS

Hereinafter, the invention will be described in detail with reference to the drawings showing its embodiments.

Embodiment 1

Figure 1:
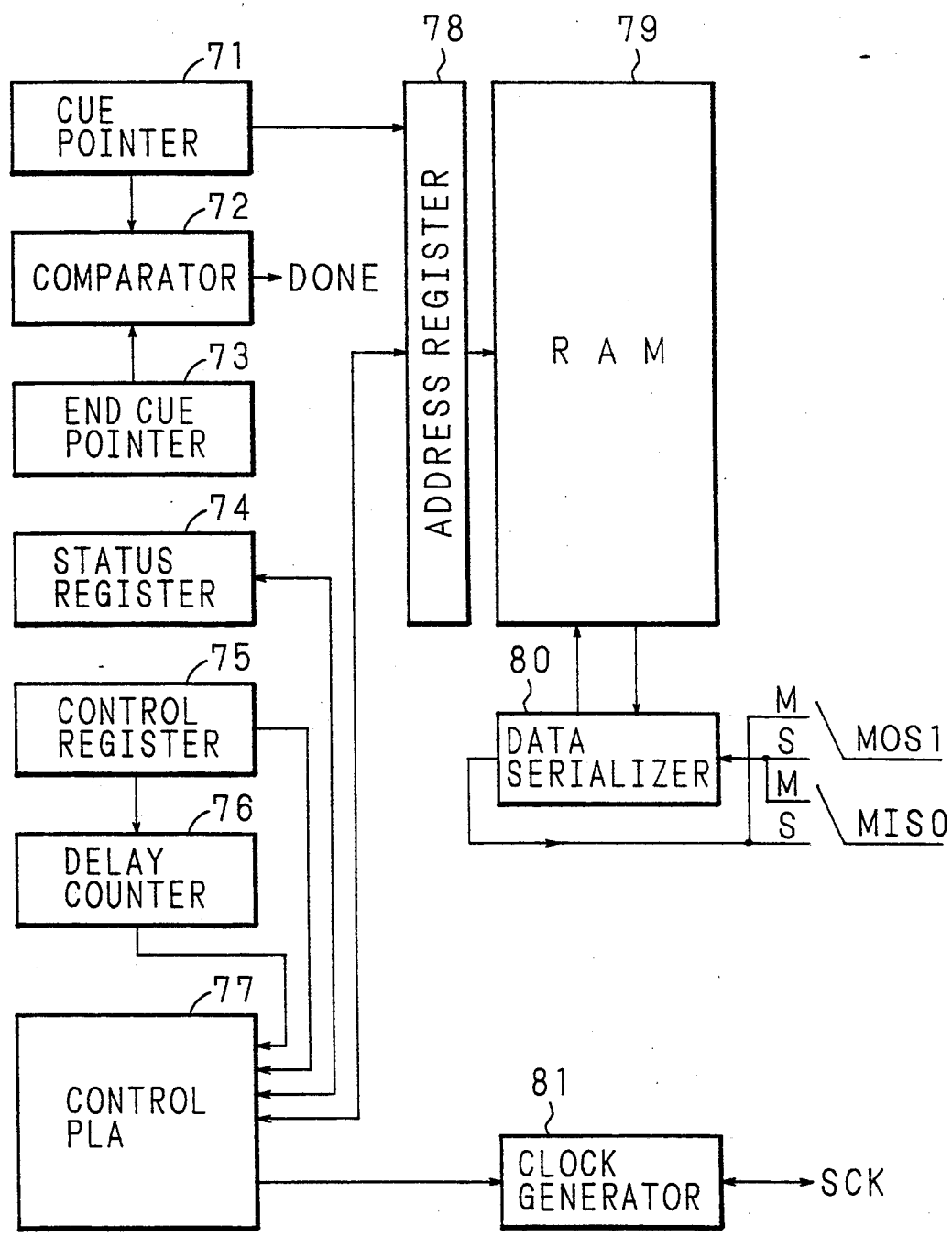
FIG. 1 is a diagram showing the configuration of a prior art serial data transfer device.
Figure 2:
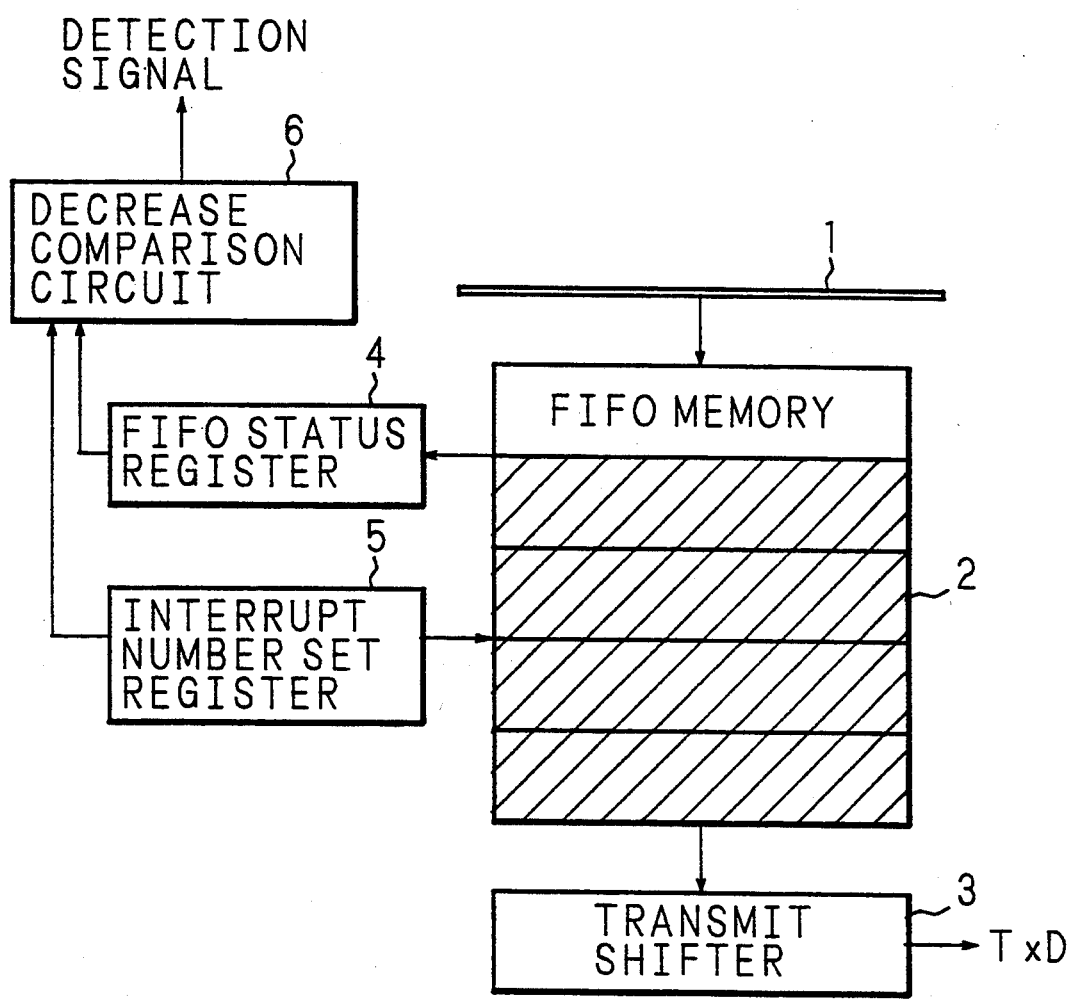
FIG. 2 is a diagram showing the configuration of a serial data transfer device (Embodiment 1) of the invention.

FIG. 2 is a diagram showing the configuration of Embodiment 1 of the invention. In FIG. 2, the reference numeral 1 designates a data bus through which data are written or read. A FIFO memory 2 can store plural parallel data and has the pushup storage function. A transmit shifter 3 which converts a parallel data into a serial data and shifts the serial data in the unit of one bit is connected to the FIFO memory 2. Furthermore, a FIFO status register 4 for indicating the number of parallel data existing in the FIFO memory 2, and an interrupt number set register 5 for setting a predetermined number of parallel data in the FIFO memory 2 are connected to the FIFO memory 2. The FIFO status register 4 outputs the number of parallel data existing in the FIFO memory 2, to a decrease comparison circuit 6. The interrupt number set register 5 outputs the set specific value to the decrease comparison circuit 6. The decrease comparison circuit 6 compares an output value of the FIFO status register 4 with an output value of the interrupt number set register 5. When the value of the FIFO status register 4 decreases and coincides with the value of the interrupt number set register 5, the circuit 6 outputs a detection signal.

Figure 3:
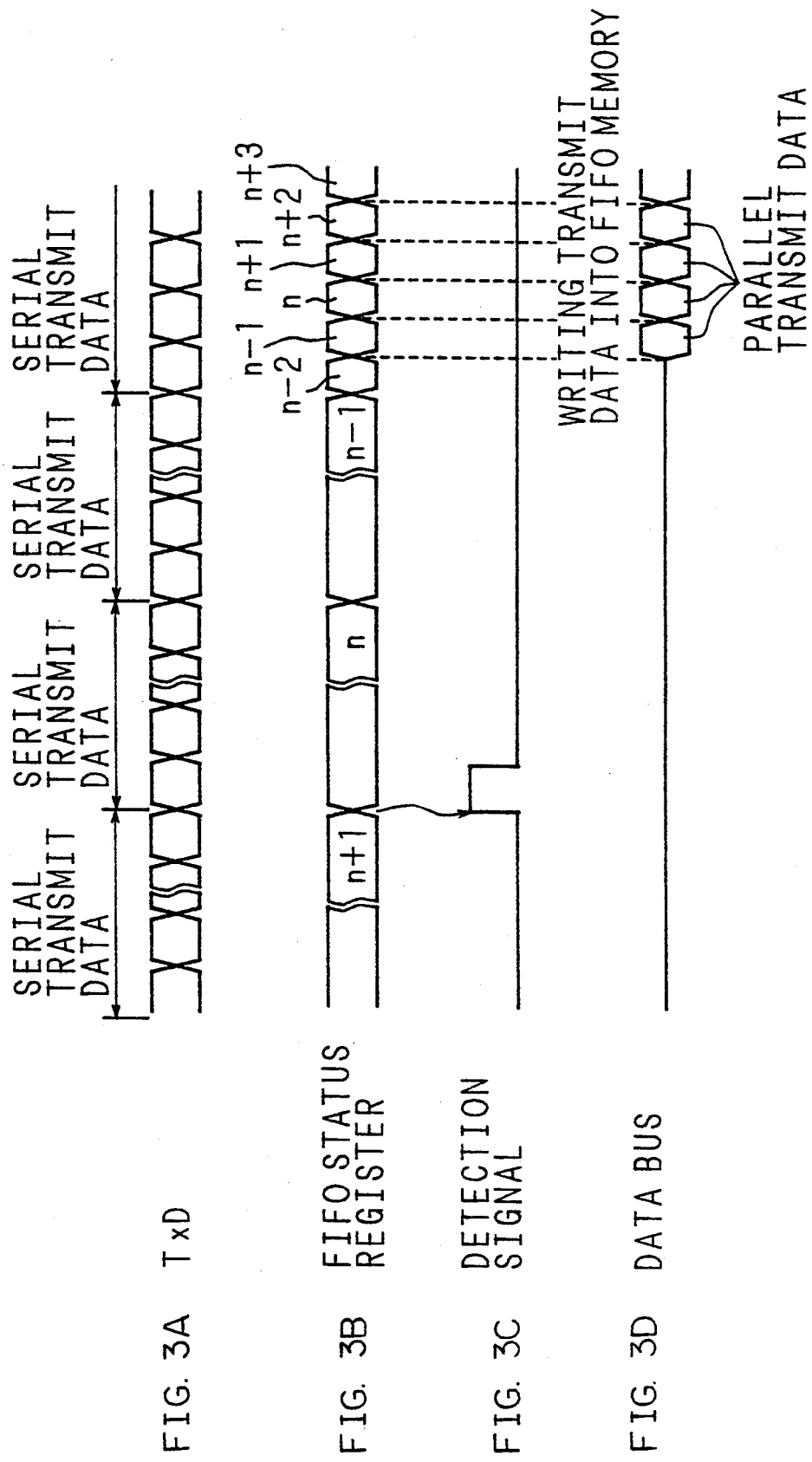
FIG. 3 is a timing chart of Embodiment 1.

Hereinafter, the operation of Embodiment 1 of the invention will be described. FIG. 3 shows a timing chart illustrating the operation.

First, before the start of a transmission process, a value must be set in the interrupt number set register 5, so that, when the number of parallel data existing in the FIFO memory 2 is decreased to the set value, an interruption occurs as described below. The case where "n" is set as the value will be described. That is, the interrupt number set register 5 is set so that, when the number of parallel data existing in the FIFO memory 2 is decreased to "n", an interruption occurs. Next, parallel data to be transmitted are written into the FIFO memory 2 through the data bus 1. In this writing, greater number of parallel data than the set value "n" must be written.

When the transmission is enabled, the parallel data appear to the transmit shifter 3 in the order in which the parallel data are written into the FIFO memory 2. The FIFO status register 4 decrements its value each time a parallel data appears from the FIFO memory 2 to the transmit shifter 3, and indicates the number of parallel data existing in the FIFO memory 2. On the other hand, the decrease comparison circuit 6 always compares the value of the FIFO status register 4 with the value of the interrupt number set register 5. The transmit shifter 3 converts a parallel data inputted from the FIFO memory 2 into a serial data, and outputs the serial data to the outside in the unit of one bit. After the final bit is transferred, the transmit shifter 3 receives again a parallel data from the FIFO memory 2, and continues the same operation until no further parallel data is supplied from the FIFO memory 2.

The timing chart of FIG. 3 shows the state in which the above-described operation is continued and the number of parallel data existing in the FIFO memory 2 is decreased to n+1. After the final bit of the currently transferred serial data is transferred, the transmit shifter 3 receives a parallel data from the FIFO memory 2. As a result, the number of parallel data existing in the FIFO memory 2 is changed from n+1 to n. In other words, the value of the FIFO status register 4 is decreased from n+1 to n. During this process, the decrease comparison circuit 6 always compares the value of the FIFO status register 4 with the value of the interrupt number set register 5. When the decrease comparison circuit 6 detects that the value of the FIFO status register 4 is decreased from n+1 to n and coincides with the value n of the interrupt number set register 5, the decrease comparison circuit 6 outputs the detection signal. The detection signal may appear.

In response to the output of the detection signal from the decrease comparison circuit 6 in the course of the continuous transmission, the CPU writes parallel data to be transmitted, into the FIFO memory 2 through the data bus 1 or supplies the parallel data to the. FIFO memory 2. While the CPU supplies the transmit data to the FIFO memory 2, the transmission is continuously maintained. Accordingly, there may arise a case where the number of parallel data existing in the FIFO memory 2 is already less than n. In such a case, the number of parallel data in the FIFO memory 2 is once increased to n in the course of supplying the transmit data from the CPU. However, the decrease comparison circuit 6 does not output the detection signal even when the value of the FIFO status register 4 is increased from n−1 to n and coincides with the value n of the interrupt number set register 5.

As described above, the provision of the means (decrease comparison circuit 6) for detecting that the number of residual transmit data in the FIFO memory 2 is decreased to less than the predetermined number allows a continuous transfer to be conducted. That is, during a process of transferring plural transmit data, the supply of transmit data can be conducted before the transmission of transmit data in the FIFO memory 2 has not yet been completed or an arbitrary number of transmit data still exist in the FIFO memory 2.

Moreover, since the number of residual transmit data in the FIFO memory 2 can be set and detected in the unit of the number of data, the device can freely cope with the frequency of supplying transmit data in accordance with the system conditions.

Embodiment 2

Figure 4:
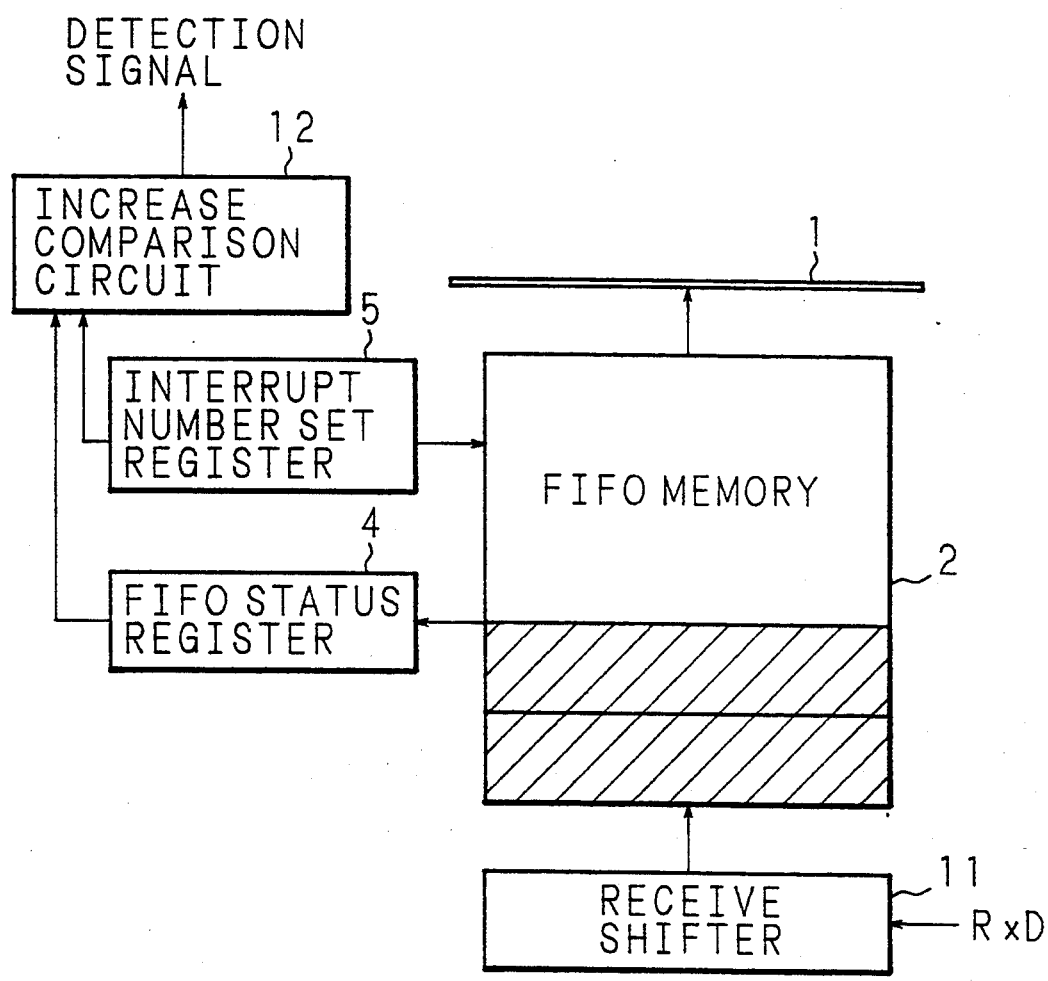
FIG. 4 is a diagram showing the configuration of a serial data transfer device (Embodiment 2) of the invention.

FIG. 4 is a diagram showing the configuration of Embodiment 2 of the invention. In FIG. 4, the portions identical with those of FIG. 2 are designated with the same reference numerals, and their description is omitted. A receive shifter 11 is connected to the FIFO memory 2. The receive shifter 11 has a parallel/serial data conversion function in which a serial data inputted from the outside is shifted in the unit of one bit, and outputs the converted parallel data to the FIFO memory 2. The reference numeral 12 designates an increase comparison circuit which compares the value of the FIFO status register 4 with the value of the interrupt number set register 5, and which outputs a detection signal when the value of the FIFO status register 4 is increased and coincides with the value of the interrupt number set register 5.

Figure 5:
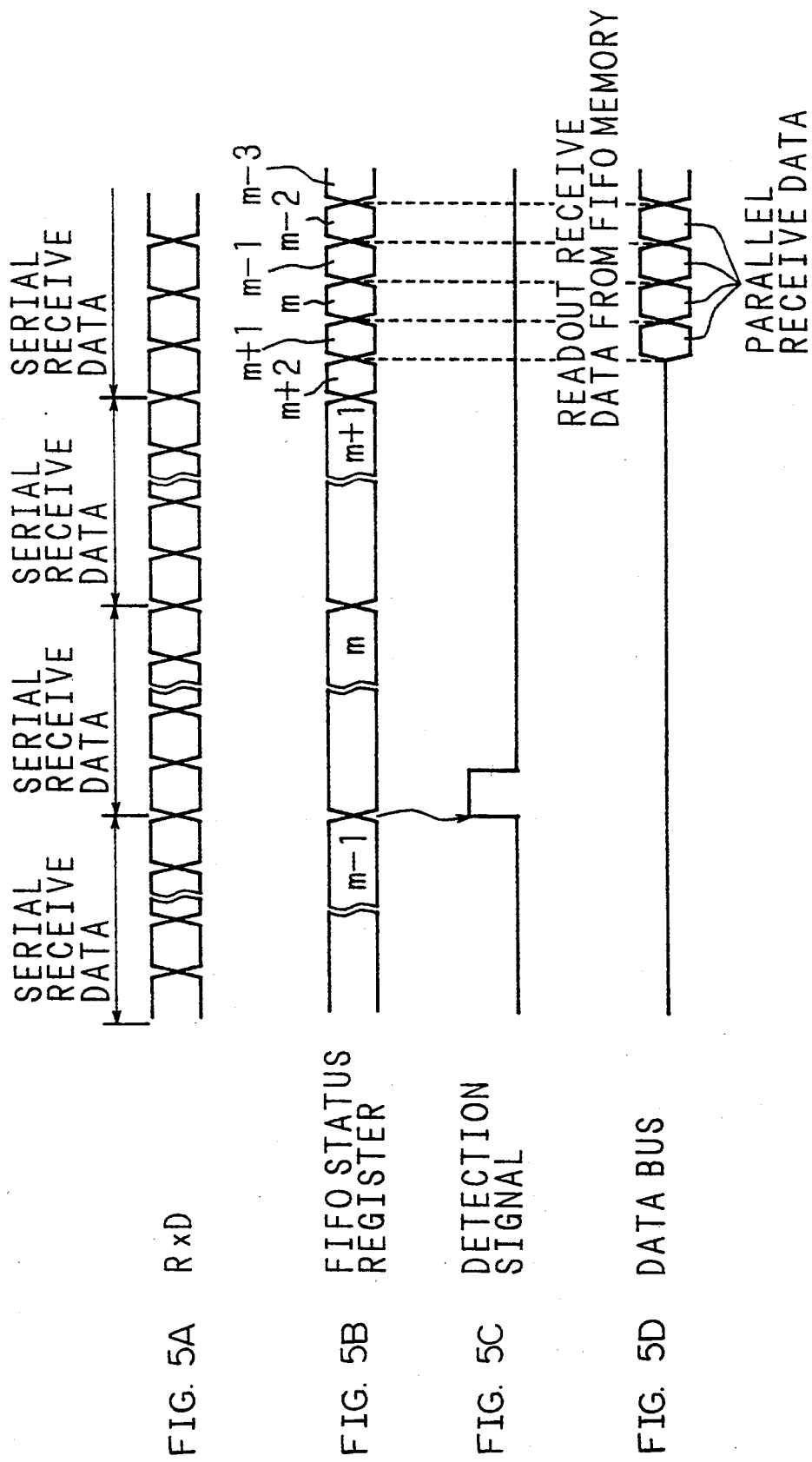
FIG. 5 is a timing chart of Embodiment 2.

Hereinafter, the operation of Embodiment 2 of the invention will be described. FIG. 5 shows a timing chart illustrating the operation.

First, before the start of a reception process, a value must be set in the interrupt number set register 5, so that, when the number of parallel data existing in the FIFO memory 2 is increased to the set value, the interruption occurs as described below. The case where "m" is set as the value will be described. That is, the interrupt number set register 5 is set so that, when the number of parallel data existing in the FIFO memory 2 is increased to "m", the interruption occurs.

When the reception is enabled, a serial data is inputted from the outside to the receive shifter 11 which in turn shifts the received serial data in the unit of one bit and converts the data into a parallel data. After the final bit of the serial data is received, the receive shifter 11 outputs the converted parallel data to the FIFO memory 2. Each time the final bit of a serial data is received, the receive shifter 11 outputs a parallel data to the FIFO memory 2. The FIFO status register 4 increments its value each time a parallel data appears from the receive shifter 11 to the FIFO memory 2, and indicates the number of parallel data existing in the FIFO memory 2. On the other hand, the increase comparison circuit 12 always compares the value of the FIFO status register 4 with the value of the interrupt number set register 5.

The timing chart of FIG. 5 shows the state in which the above-described operation is continued and the number of parallel data existing in the FIFO memory 2 is increased to m−1. After the final bit of the currently received serial data is received, the receive shifter 11 outputs a parallel data to the FIFO memory 2. As a result, the number of parallel data existing in the FIFO memory 2 is changed from m−1 to m. In other words, the value of the FIFO status register 4 is increased from m−1 to m. During this process, the increase comparison circuit 12 always compares the value of the FIFO status register 4 with the value of the interrupt number set register 5. When the increase comparison circuit 12 detects that the value of the FIFO status register 4 is increased from m−1 to m and coincides with the value m of the interrupt number set register 5, the increase comparison circuit 12 outputs a detection signal. The detection signal may appear.

In response to the output of the detection signal from the increase comparison circuit 12 in the course of the continuous reception, the CPU reads out parallel data which have been received, from the FIFO memory 2. While the CPU reads out the receive data from the FIFO memory 2, the reception is continuously maintained. Accordingly, there may arise a case where the number of parallel data existing in the FIFO memory 2 is already greater than m. In such a case, the number of parallel data in the FIFO memory 2 is once decreased to m in the course of the process of reading out the receive data by the CPU. However, the increase comparison circuit 12 does not output a detection signal even when the value of the FIFO status register 4 is decreased from m+1 to m and coincides with the value m of the interrupt number set register 5.

As described above, the provision of the means (increase comparison circuit 12) for detecting that the number of residual transmit data in the FIFO memory 2 is increased to be greater than the predetermined number allows a continuous transfer to be conducted. That is, during a process of transferring plural receive data, the reading of receive data can be conducted before the FIFO memory 2 is completely filled or while an arbitrary number of receive data still exist in the FIFO memory 2.

Moreover, since the number of residual receive data in the FIFO memory 2 can be set and detected in the unit of the number of data, the frequency of reading out receive data can freely be adjusted in accordance with the system conditions.

Embodiment 3

Figure 6:
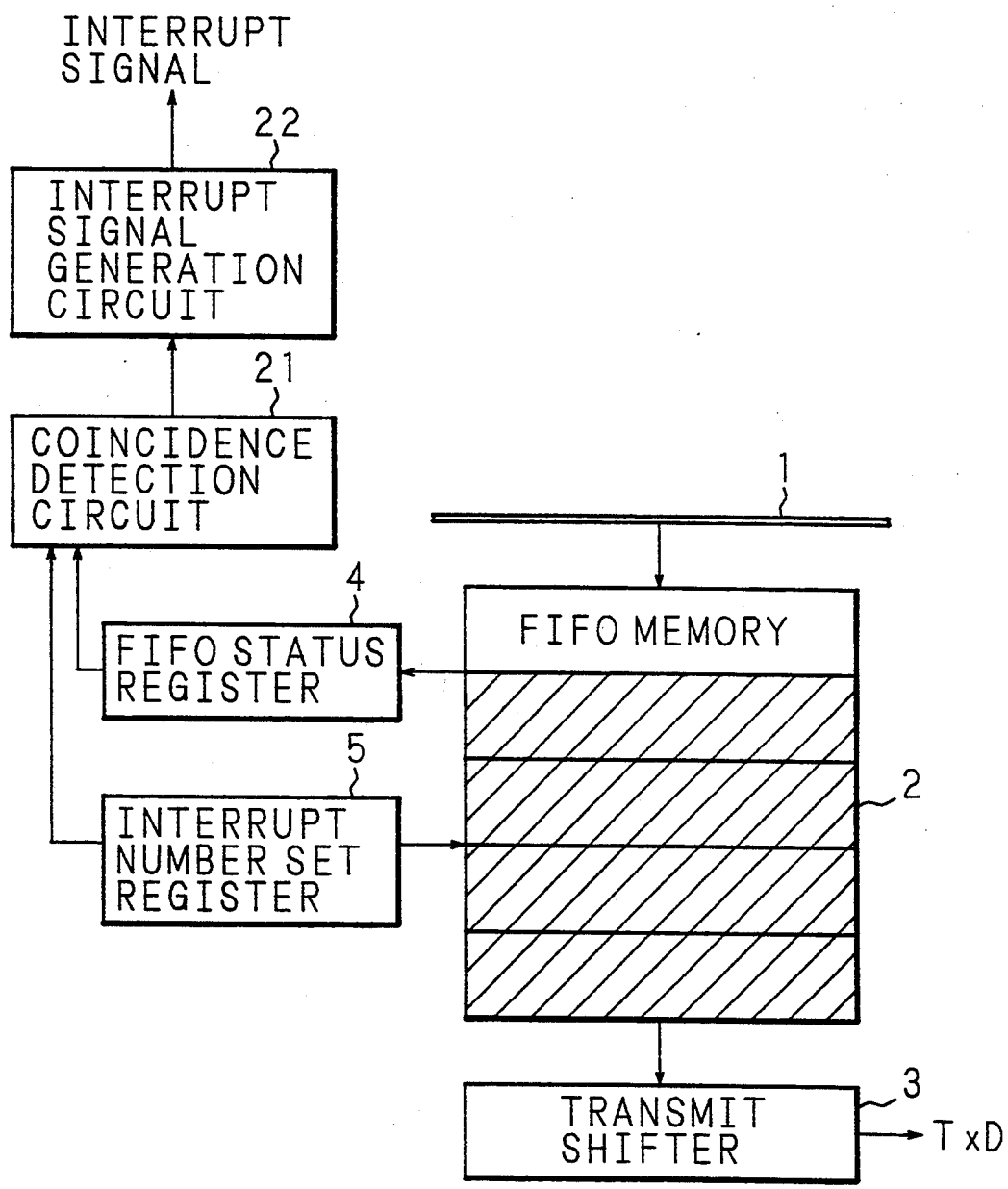
FIG. 6 is a diagram showing the configuration of a serial data transfer device (Embodiment 3) of the invention.

FIG. 6 is a diagram showing the configuration of Embodiment 3 of the invention. In FIG. 6, the portions identical with those of FIG. 2 are designated with the same reference numerals, and their description is omitted. A coincidence detection circuit 21 is connected to the FIFO status register 4 and also to the interrupt number set register 5. The coincidence detection circuit 21 compares the value of the FIFO status register 4 with the value of the interrupt number set register 5. When the two values coincide with each other, the coincidence detection circuit 21 outputs a detection signal to an interrupt signal generation circuit 22. Upon receiving the detection signal from the coincidence detection circuit 21, the interrupt signal generation circuit 22 generates an interrupt signal.

Figure 7:
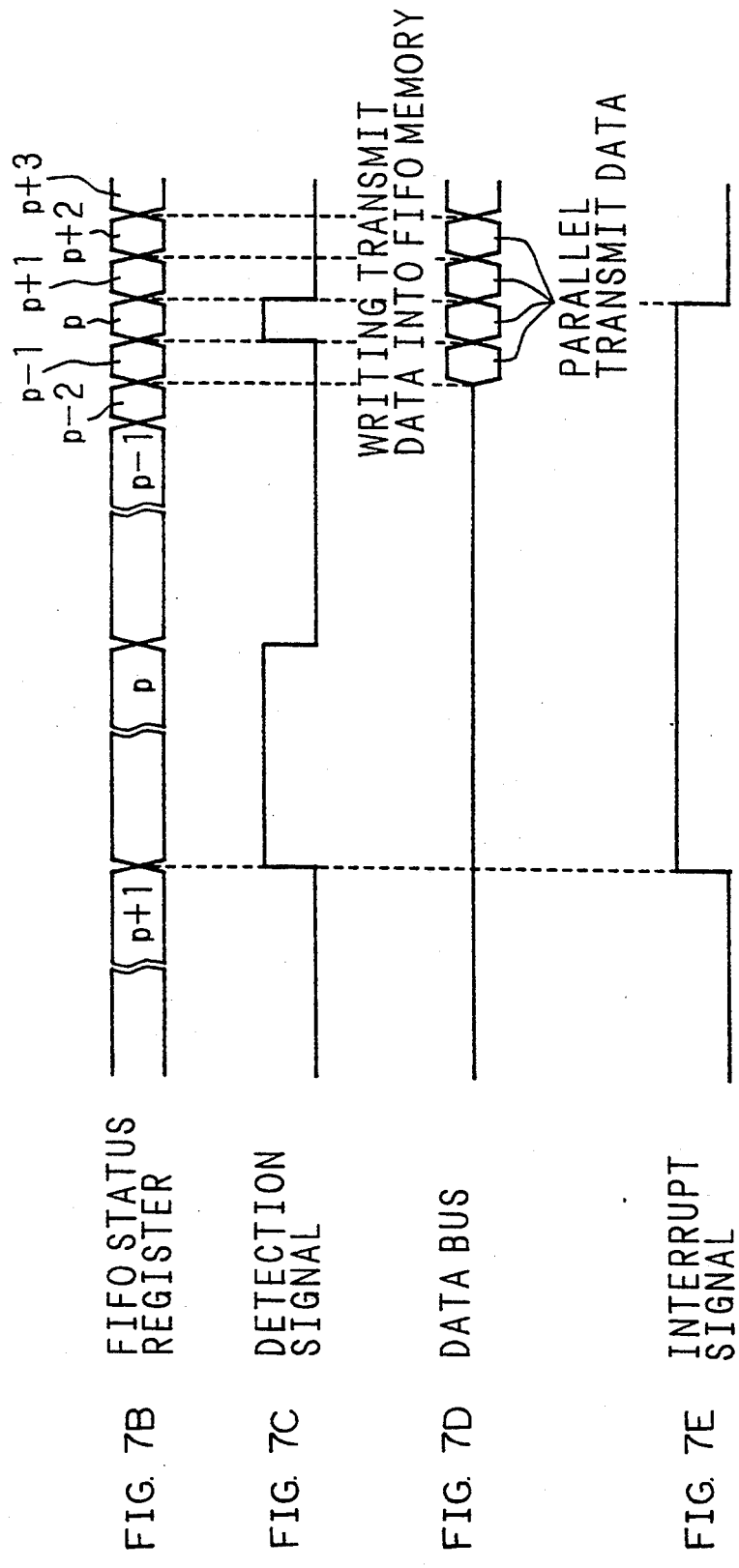
FIG. 7 is a timing chart of Embodiment 3.

Hereinafter, the operation of Embodiment 3 of the invention will be described. FIG. 7 shows a timing chart illustrating the operation.

First, before the start of a transmission process, a value must be set in the interrupt number set register 5, so that, when the number of parallel data existing in the FIFO memory 2 is decreased to the set value or less, an interruption occurs as described below. The case where "p" is set as "the value will be described. That is, the register 5 is set so that, when the number of parallel data existing in the FIFO memory 2 is decreased to "p" or less, an interruption occurs. Next, parallel data to be transmitted are written into the FIFO memory 2 though the data bus 1. In this writing, parallel data the number of which is greater than the set value "p" must be written.

When the transmission is enabled, the parallel data appear to the transmit shifter 3 in the order in which the parallel data are written into the FIFO memory 2. The FIFO status register 4 decrements its value each time a parallel data appears from the FIFO memory 2 to the transmit shifter 3, and indicates the number of parallel data existing in the FIFO memory 2. On the other hand, the coincidence detection circuit 21 always compares the value of the FIFO status register 4 with the value of the interrupt number set register 5. The transmit shifter 3 converts a parallel data inputted from the FIFO memory 2 into a serial data, and outputs the serial data to the outside in the unit of one bit. After the final bit is transferred, a parallel data from the FIFO memory 2 is inputted again from FIFO memory 2, and the same operation is continued until no further parallel data is supplied from the FIFO memory 2.

The timing chart of FIG. 7 shows the state in which the above-described operation is continued and the number of parallel data existing in the FIFO memory 2 is decreased to p+1. After the final bit of the currently transferred serial data is transferred, the transmit shifter 3 receives a parallel data from the FIFO memory 2. As a result, the number of parallel data existing in the FIFO memory 2 is changed from p+1 to p. In other words, the value of the FIFO status register 4 is decreased from p+1 to p.

During this process, the coincidence detection circuit 21 always compares the value of the FIFO status register 4 with the value of the interrupt number set register 5. When the coincidence detection circuit 21 detects that the value of the FIFO status register 4 is decreased from p+1 to p and coincides with the value p of the interrupt number set register 8, the coincidence detection circuit 21 outputs a detection signal to the interrupt signal generation circuit 22. In response to the detection signal from the coincidence detection circuit 21, the interrupt signal generation circuit 22 outputs an interrupt signal to the CPU. The interrupt signal generation circuit 22 continues to output the interrupt signal until the circuit receives again the detection signal from the coincidence detection circuit 21.

In response to the output of the interrupt signal from the interrupt signal generation circuit 22 in the course of the continuous transmission, the CPU writes parallel data to be transmitted, into the FIFO memory 2 through the data bus 1 and supplies the parallel data to the FIFO memory 2, while the interrupt signal appears. While the CPU supplies the transmit data to the FIFO memory 2, the transmission is continuously maintained. Accordingly, there may arise a case where the number of parallel data existing in the FIFO memory 2 is already less than p. In such a case, the number of parallel data in the FIFO memory 2 is once increased to p in the course of supplying the transmit data from the CPU. The coincidence detection circuit 21 detects again that the value of the FIFO status register 4 coincides with the value p of the interrupt number set register 5, and outputs a detection signal. The interrupt signal generation circuit 22 which has received the detection signal judges that transmit data have been written, and stops the output of the interrupt signal.

As described above, the provision of the means (coincidence detection circuit 21) for detecting that the number of residual transmit data in the FIFO memory 2 is less than the number allows a continuous transfer to be conducted. That is, during a process of transferring plural transmit data, the supply of transmit data can be conducted before the transmission of transmit data in the FIFO memory 2 has not yet been completed or an arbitrary number of transmit data still exist in the FIFO memory 2.

Moreover, since the number of residual transmit data in the FIFO memory 2 can be set and detected in the unit of the number of data, the device can freely cope with the frequency of supplying transmit data in accordance with the system conditions.

Embodiment 4

Figure 8:
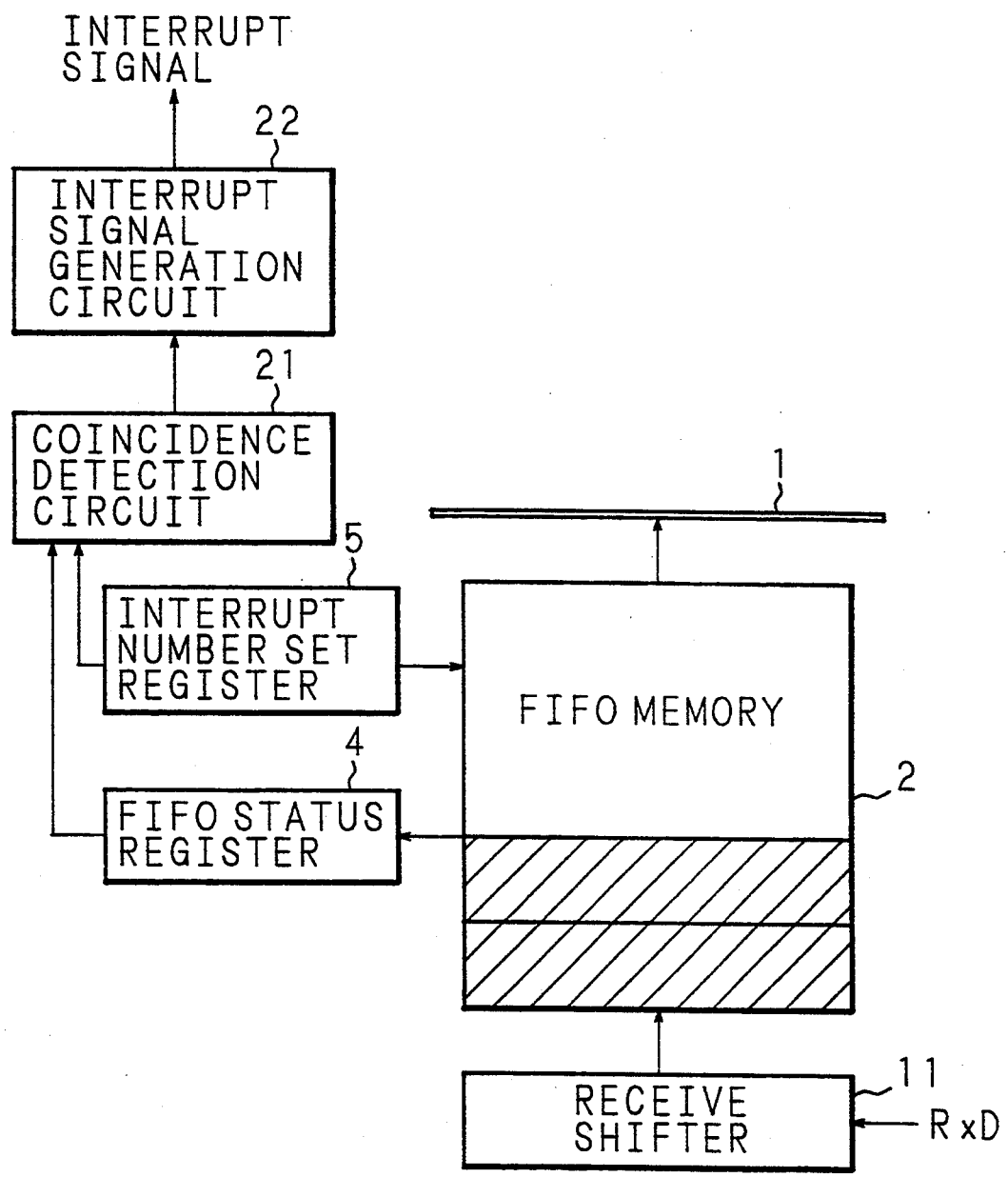
FIG. 8 is a diagram showing the configuration of a serial data transfer device (Embodiment 4) of the invention.

FIG. 8 is a diagram showing the configuration of Embodiment 4 of the invention. In FIG. 8, the portions identical with those of FIGS. 4 and 6 are designated with the same reference numerals, and their description is omitted.

Figure 9:
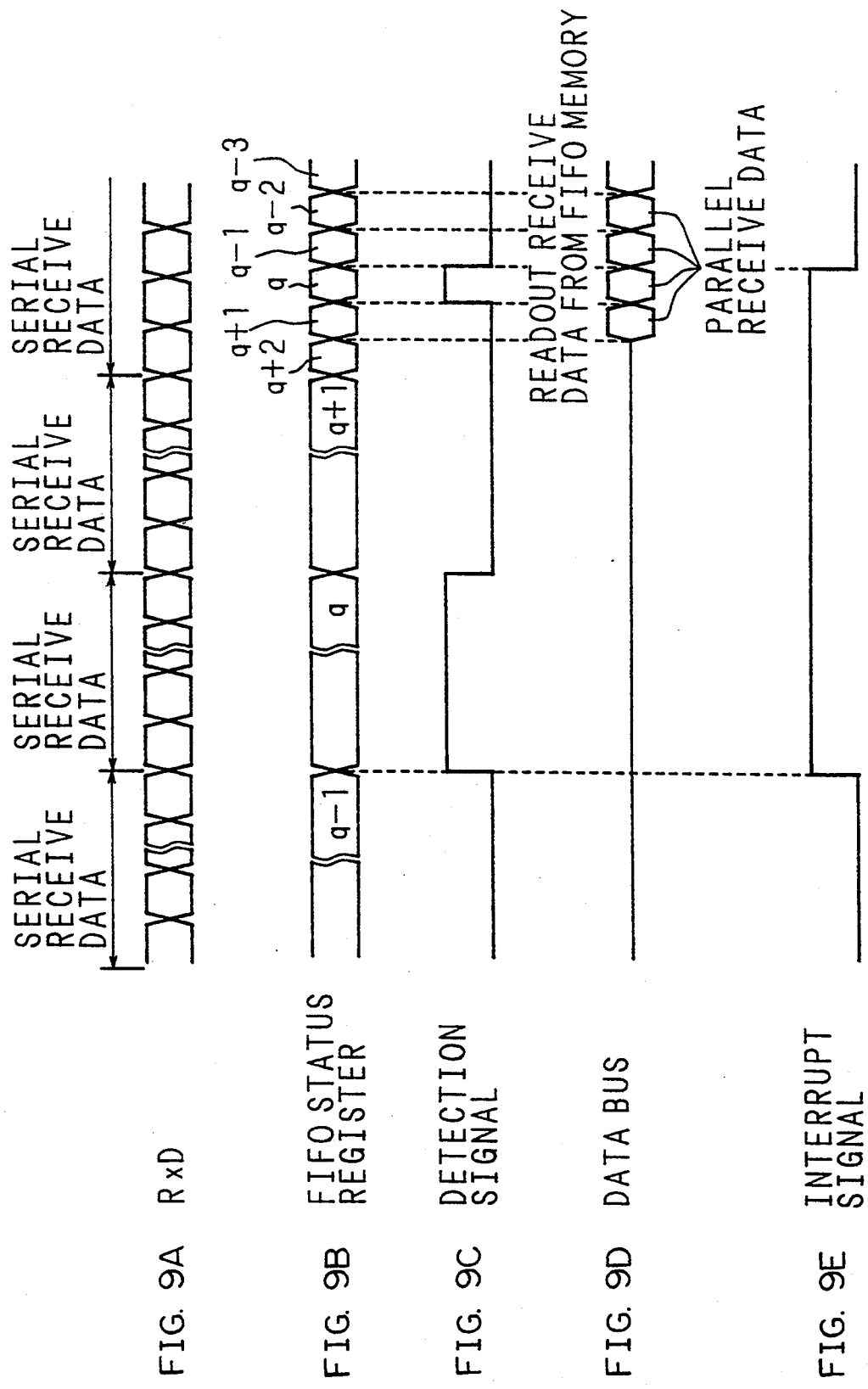
FIG. 9 is a timing chart of Embodiment 4.

Hereinafter, the operation of Embodiment 4 of the invention will be described. FIG. 9 shows a timing chart illustrating the operation.

First, before the start of a reception process, a value must be set in the interrupt number set register 5, so that, when the number of parallel data existing in the FIFO memory 2 is increased to the set value or more, an interruption occurs as described below. The case where "q" is set as the value will be described. That is, the register 5 is set so that, when the number of parallel data existing in the FIFO memory 2 becomes "q" or more, an interruption occurs.

When the reception is enabled, a serial data is inputted from the outside to the receive shifter 11 which in turn shifts the received serial data in the unit of one bit and converts the data into a parallel data. After the final bit of the serial data is received, the receive shifter 11 outputs the converted parallel data to the FIFO memory 2. Each time the final bit of a serial data is received, the receive shifter 11 outputs a parallel data to the FIFO memory 2. The FIFO status register 4 increments its value each time a parallel data appears from the receive shifter 11 to the FIFO memory 2, and indicates the number of parallel data existing in the FIFO memory 2. On the other hand, the coincidence detection circuit 21 always compares the value of the FIFO status register 4 with the value of the interrupt number set register 5.

The timing chart of FIG. 9 shows the state in which the above-described operation is continued and the number of parallel data existing in the FIFO memory 2 is increased to q−1. After the final bit of the currently received serial data is received, the receive shifter 11 outputs a parallel data to the FIFO memory 2. As a result, the number of parallel data existing in the FIFO memory 2 is changed from q−1 to q. In other words, the value of the FIFO status register 4 is increased from q−1 to q.

During this process, the coincidence detection circuit 21 always compares the value of the FIFO status register 4 with the value of the interrupt number set register 5. When the coincidence detection circuit 21 detects that the value of the FIFO status register 4 coincides with the value of the interrupt number set register 5, the circuit 21 outputs a detection signal to the interrupt signal generation circuit 22. In response to the detection signal from the coincidence detection circuit 21, the interrupt signal generation circuit 22 outputs an interrupt signal to the CPU. The interrupt signal generation circuit 22 continues to output the interrupt signal until the circuit receives again the detection signal from the coincidence detection circuit 21.

In response to the output of the interrupt signal from the interrupt signal generation circuit 22 in the course of the continuous reception, the CPU reads out parallel data which have been received, from the FIFO memory 2. While the CPU reads out the receive data from the FIFO memory 2, the reception is continuously maintained. Accordingly, there may arise a case where the number of parallel data existing in the FIFO memory 2 is already greater than q. In such a case, the number of parallel data in the FIFO memory 2 is once decreased to p in the course of reading out the receive data by the CPU. The coincidence detection circuit 21 detects again that the value of the FIFO status register 4 coincides with the value q of the interrupt number set register 5, and outputs a detection signal. The interrupt signal generation circuit 22 which has received the detection signal judges that receive data have been read out, and stops the output of the interrupt signal.

As described above, the provision of the means (coincidence detection circuit 21) for detecting that the number of residual transmit data in the FIFO memory 2 is greater than the predetermined number allows a continuous transfer to be conducted. That is, during a process of transferring plural receive data, receive data can be read out from the FIFO memory 2 before the FIFO memory 2 is completely filled or while an arbitrary number of receive data still exist in the FIFO memory 2.

Moreover, since the number of residual receive data in the FIFO memory 2 can be set and detected in the unit of the number of data, the frequency of reading receive data can freely be adjusted in accordance with the system conditions.

Embodiment 5

Figure 10:
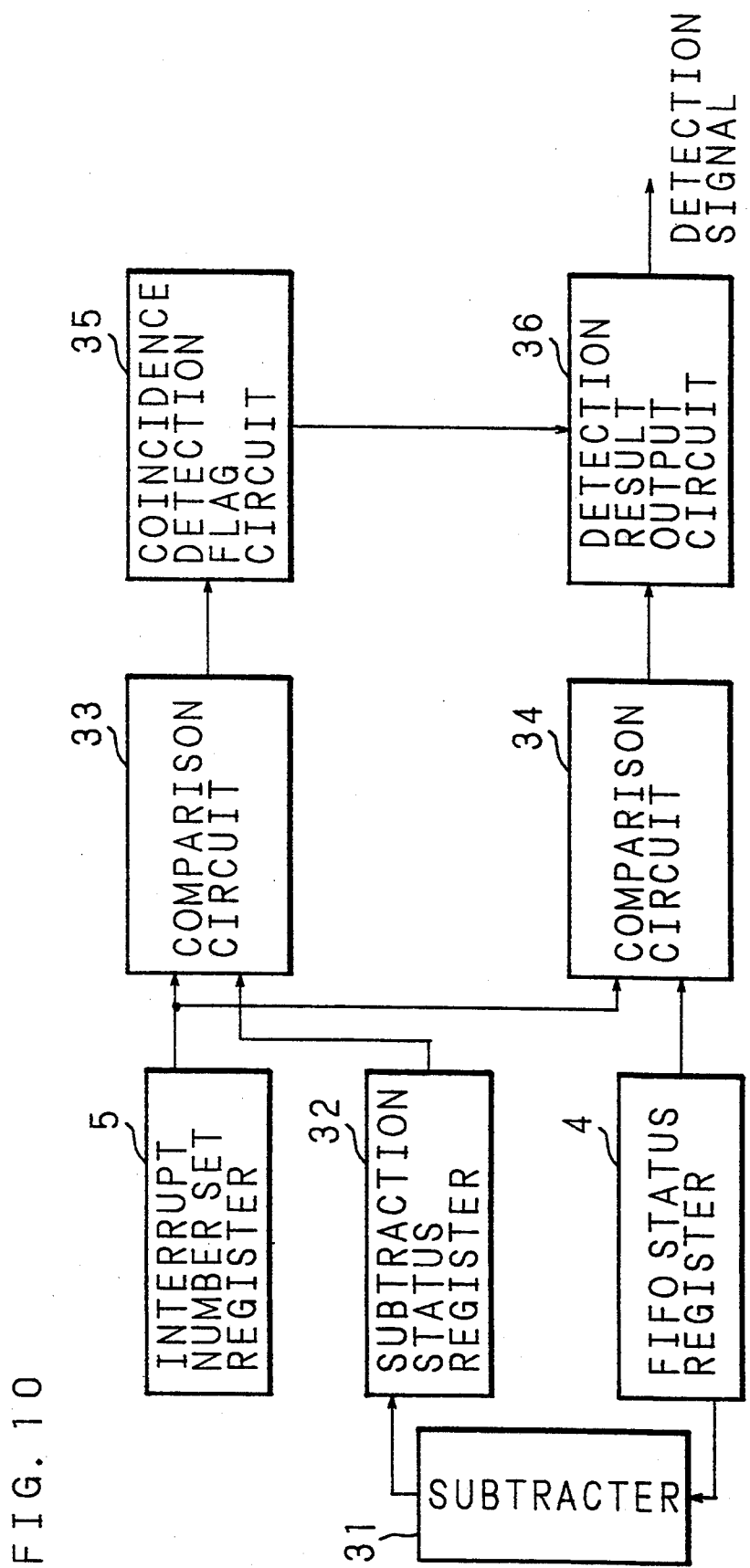
FIG. 10 is a diagram showing the configuration of a serial data transfer device (Embodiment 5) of the invention.

Embodiment 5 of the invention which shows a specific example of the configuration of the decrease comparison circuit 6 used in Embodiment 1 will be described. FIG. 10 is a diagram showing the configuration of the decrease comparison circuit 6 according to Embodiment 5. In FIG. 10, the FIFO status register 4 and the interrupt number set register 5 are also shown.

Referring to FIG. 10, the reference numeral 31 designates a subtracter which subtracts one from the value of the FIFO status register 4 (value indicative of the number of parallel data existing in the FIFO memory 2). The subtracter 31 outputs the decremented value to a subtraction status register 32. The subtraction status register 32 stores the input value (value obtained by subtracting one from the value of the FIFO status register 4), and the stored value is read out by a comparison circuit 33 as required. The FIFO status register 4 outputs the number of parallel data existing in the FIFO memory 2, to a comparison circuit 34. Moreover, the interrupt number set register 5 outputs the set value to the comparison circuits 33 and 34. The comparison circuit 33 compares the value of the interrupt number set register 5 with the value of the subtraction status register 32. When the two values coincide with each other, the comparison circuit 33 outputs a coincidence signal to a coincidence detection flag circuit 35, and, when the two values fail to coincide with each other, the comparison circuit 33 outputs a noncoincidence signal to the circuit 35. The comparison circuit 34 compares the value of the interrupt number set register 5 with the value of the FIFO status register 4. When the two values coincide with each other, the comparison circuit 34 outputs a coincidence signal to a detection result output circuit 36, and, when the two values fail to coincide with each other, the comparison circuit 34 outputs a noncoincidence signal to the circuit 36. When the coincidence detection flag circuit 35 receives the coincidence signal from the comparison circuit 33, the circuit 35 sets a flag after one cycle (fundamental operation time unit of the CPU), and outputs a signal indicating whether the flag is set or not to the detection result output circuit 36. When the flag is set in the coincidence detection flag circuit 35, the detection result output circuit 36 outputs the coincidence signal from the comparison circuit 34 as a detection signal.

Figure 11:
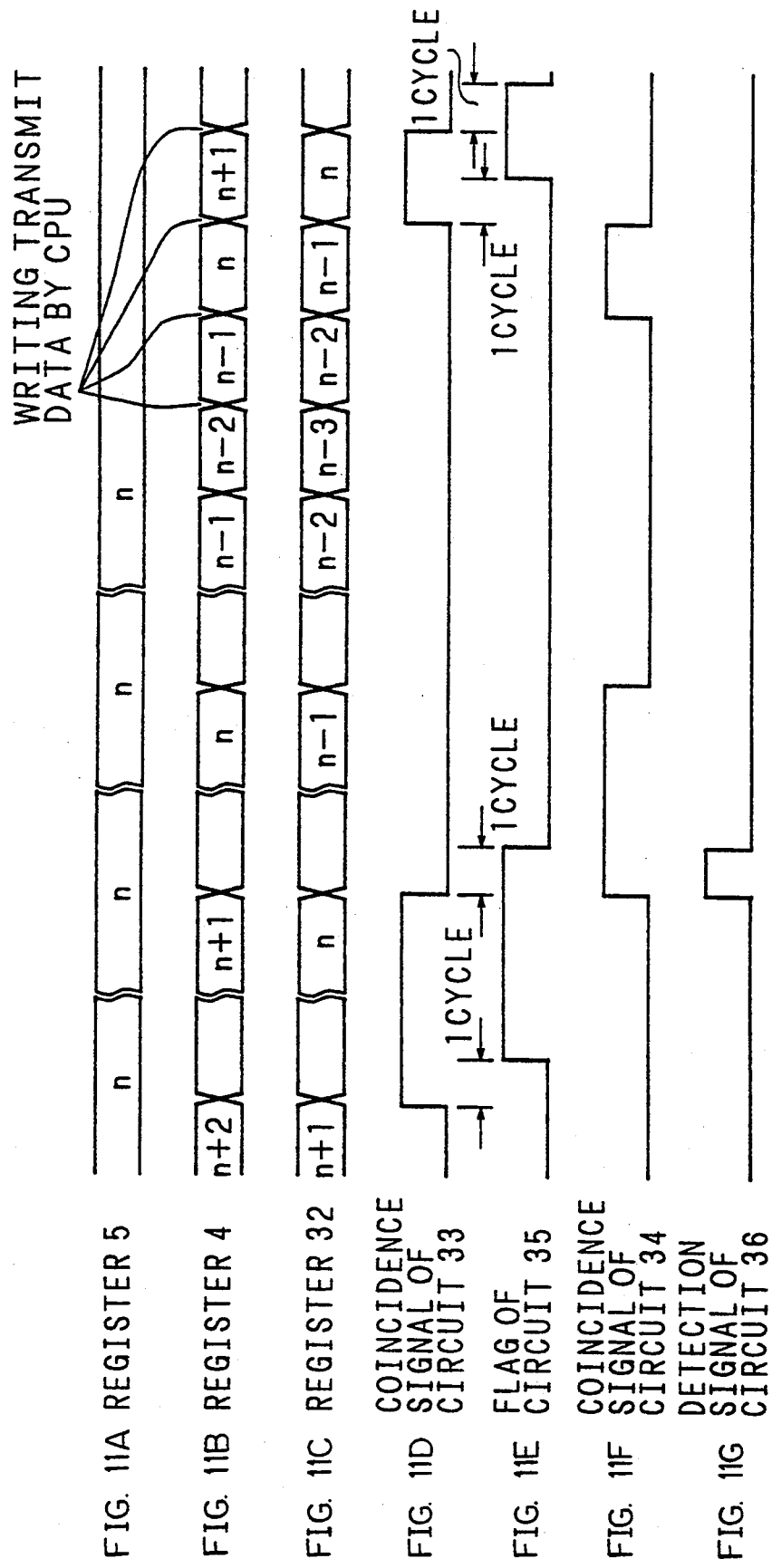
FIG. 11 is a timing chart of Embodiment 5.

Hereinafter, the operation of Embodiment 5 of the invention will be described. FIG. 11 shows a timing chart illustrating the operation.

First, a value is set in the interrupt number set register 5, so that, when the number of parallel data existing in the FIFO memory 2 is decreased to the set value, the interruption occurs as described below. The case where "n" is set as the value in the same manner as Embodiment 1 will be described. That is, the register 5 is set so that, when the number of parallel data existing in the FIFO memory 2 is decreased to "n", the interruption occurs. As described in Embodiment 1, the FIFO status register 4 decrements its value each time a transmit data is inputted from the FIFO memory 2 into the transmit shifter 3. A value obtained by subtracting one from the value of the FIFO status register 4 in the subtracter 31 is always inputted to the subtraction status register 32.

The comparison circuits 33 and 34 always compare the values of the registers with each other. More specifically, the comparison circuit 33 always compares the value of the interrupt number set register 5 with the value of the subtraction status register 32, and the comparison circuit 34 always compares the value of the interrupt number set register 5 with the value of the FIFO status register 4. When the value of the FIFO status register 4 becomes n+1, n is inputted to the subtraction status register 32, and the comparison circuit 33 compares the value n with the value n of the interrupt number set register 5. In this case, it is detected that the two values coincide with each other. In response to the coincidence signal, the coincidence detection flag circuit 35 sets a flag in the next cycle. On the other hand, when the value of the FIFO status register 4 becomes n+1, the comparison circuit 34 compares the value with the value n of the interrupt number set register 5. Since the two values fail to coincide with each other, the comparison circuit 34 outputs a noncoincidence signal to the detection result output circuit 36. Consequently, irrespective of the set status of the flag of the coincidence detection flag circuit 35, the detection result output circuit 36 does not output a detection signal.

When the value of the FIFO status register 4 is then decreased to n, the comparison circuit 33 compares the value n−1 which is inputted to the subtraction status register 32, with the value n of the interrupt number set register 5. In this case, a noncoincidence is detected, and the comparison circuit 33 outputs a noncoincidence signal to the coincidence detection flag circuit 35. In response to the noncoincidence signal, the coincidence detection flag circuit 35 resets the flag in the next cycle. On the other hand, when the value of the FIFO status register 4 becomes n, the comparison circuit 34 compares the value with the value n of the interrupt number set register 5. Since the two values coincide with each other in this comparison, the comparison circuit 34 outputs a coincidence signal to the detection result output circuit 36. In this case, since the flag of the coincidence detection flag circuit 35 is set in the previous cycle, the detection result output circuit 36 outputs the coincidence signal of the comparison circuit 34 as a detection signal.

As described above, in response to the detection signal from the detection result output circuit 36, the CPU writes a transmit data into the FIFO memory 2. At this time, the transmission is continuously conducted. Accordingly, there may arise a case where the value of FIFO status register 4 is less than n. The case where the CPU writes a transmit data into the FIFO memory 2 when the value of the FIFO status register 4 becomes n−2 as shown in the timing chart of FIG. 11 will be described.

When the CPU writes a transmit data into the FIFO memory 2 under the state where the value of the FIFO status register 4 is n−2, the value of the FIFO status register 4 is increased to n−1. On the other hand, the value n−2 is inputted to the subtraction status register 32 by the subtracter 31. The comparison circuit 33 compares the value n of the interrupt number set register 5 with the value n−2 of the subtraction status register 32, and outputs a noncoincidence signal. In contrast, the comparison circuit 34 compares the value n of the interrupt number set register 5 with the value n−1 of the FIFO status register 4, and outputs a noncoincidence signal. In both the comparison circuits 33 and 34, the comparison results indicate a noncoincidence. Therefore, the detection result output circuit 36 does not output a detection signal.

When the CPU writes a transmit data into the FIFO memory 2, the value of the FIFO status register 4 is increased to n. On the other hand, the value n−1 is inputted to the subtraction status register 32 by the subtracter 31. The comparison circuit 33 compares the value n of the interrupt number set register 5 with the value n−1 of the subtraction status register 32, and outputs a noncoincidence signal. In contrast, the comparison circuit 34 compares the value n of the interrupt number set register 5 with the value n of the FIFO status register 4, and outputs a coincidence signal. Since the comparison result of the comparison circuit 33 indicates the noncoincidence and a flag of the coincidence detection flag circuit 35 is not set, the detection result output circuit 36 does not output a detection signal.

Further, when the CPU writes a transmit data into the FIFO memory 2, the value of the FIFO status register 4 is increased to n+1. On the other hand, the value n is inputted to the subtraction status register 32 by the subtracter 31. The comparison circuit 33 compares the value n of the interrupt number set register 5 with the value n of the subtraction status register 32, and outputs a coincidence signal. In contrast, the comparison circuit 34 compares the value n of the interrupt number set register 5 with the value n+1 of the FIFO status register 4, and outputs a noncoincidence signal. Since the comparison result of the comparison circuit 34 indicates the noncoincidence, the detection result output circuit 36 does not output a detection signal.

Even when the CPU further writes a transmit data into the FIFO memory 2 in the same manner and the value of the FIFO status register 4 reaches the value of the interrupt number set register 5, the detection result output circuit 36 does not again output a detection signal.

As described above, the provision of the means (coincidence detection flag circuit 35) for storing the number of transmit data which is less by one than the number of transmit data in the FIFO memory, for comparing the stored number with a predetermined number, and for setting a flag when the numbers coincide with each other allows only the case where the number of transmit data is decreased, to be detected.

Embodiment 6

Figure 12:
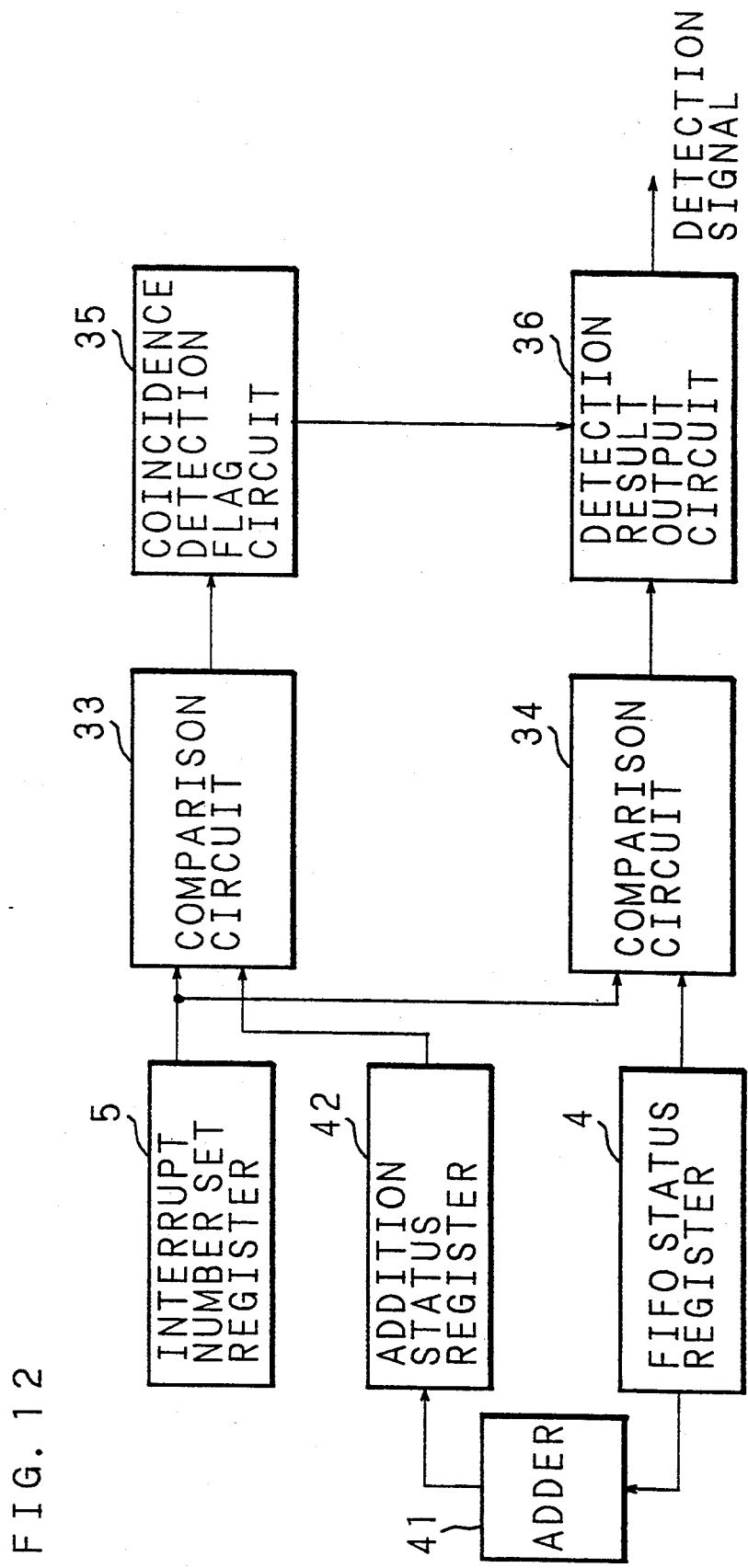
FIG. 12 is a diagram showing the configuration of a serial data transfer device (Embodiment 6) of the invention.

Embodiment 6 of the invention which shows a specific example of the configuration of the increase comparison circuit 12 used in Embodiment 2 will be described. FIG. 12 is a diagram showing the configuration of the increase comparison circuit 12 according to Embodiment 6. In FIG. 12, the FIFO status register 4 and the interrupt number set register 5 are also shown.

In FIG. 12, the portions identical with those of FIG. 10 are designated by the same reference numeral, and their description is omitted. Referring to FIG. 12, the reference numeral 41 designates an adder which adds one to the value of the FIFO status register 4 (value indicative of the number of parallel data existing in the FIFO memory 2). The adder 41 outputs the incremented value to an addition status register 42. The addition status register 42 stores the input value (value obtained by adding one to the value of the FIFO status register 4), and the stored value is read out by the comparison circuit 33 as required.

Hereinafter, the operation of Embodiment 6 of the invention will be described. FIG. 13 shows a timing chart illustrating the operation.

A value is set in the interrupt number set register 5, so that, when the number of parallel data existing in the FIFO memory 2 is increased to the set value, the interruption occurs as described below. The case where "m" is set as the value in the same manner as Embodiment 2 will be described. That is, the register 5 is set so that, when the number of parallel data existing in the FIFO memory 2 is increased to "m", the interruption occurs. As described in Embodiment 2, the FIFO status register 4 increments its value each time a receive data is inputted from the receive shifter 11 into the FIFO memory 2. A value obtained by adding one to the value of the FIFO status register 4 in the adder 41 is inputted to the addition status register 42.

The comparison circuits 33 and 34 always compare the values of the registers with each other. More specifically, the comparison circuit 33 always compares the value of the interrupt number set register 5 with the value of the addition status register 42, and the comparison circuit 34 always compares the value of the interrupt number set register 5 with the value of the FIFO status register 4. When the value of the FIFO status register 4 becomes m−1, m is inputted to the addition status register 42, and the comparison circuit 33 compares the value m with the value m of the interrupt number set register 5. In this case, it is detected that the two values coincide with each other, and the comparison circuit 33 outputs a coincidence signal to the coincidence detection flag circuit 35. In response to the coincidence signal, the coincidence detection flag circuit 35 sets a flag in the next cycle. On the other hand, when the value of the FIFO status register 4 becomes m−1, the comparison circuit 34 compares the value with the value m of the interrupt number set register 5. Since the two values fail to coincide with each other, the comparison circuit 34 outputs a noncoincidence signal to the detection result output circuit 36. Consequently, irrespective of the set status of the flag of the coincidence detection flag circuit 35, the detection result output circuit 36 does not output a detection signal.

When the value of the FIFO status register 4 is then increased to m, the comparison circuit 33 compares the value m+1 which is inputted to the addition status register 42, with the value m of the interrupt number set register 5. In this case, a noncoincidence is detected, and the comparison circuit 33 outputs a noncoincidence signal to the coincidence detection flag circuit 35. In response to the noncoincidence signal, the coincidence detection flag circuit 35 resets the flag in the next cycle. On the other hand, when the value of the FIFO status register 4 becomes m, the comparison circuit 34 compares the value with the value m of the interrupt number set register 5. Since the two values coincide with each other in this comparison, the comparison circuit 34 outputs a coincidence signal to the detection result output circuit 36. In this case, since the flag of the coincidence detection flag circuit 35 is set in the previous cycle, the detection result output circuit 36 outputs the coincidence signal of the comparison circuit 34 as a detection signal.

As described above, in response to the detection signal from the detection result output circuit 36, the CPU reads out a receive data from the FIFO memory 2. At this time, the reception is continuously conducted. Accordingly, there may arise a case where the value of FIFO status register 4 is greater than m. The case where the CPU reads out a receive data from the FIFO memory 2 when the value of the FIFO status register 4 becomes m+2 as shown in the timing chart of FIG. 13 will be described.

When the CPU reads out a receive data from the FIFO memory 2 under the state where the value of the FIFO status register 4 is m+2, the value of the FIFO status register 4 is decreased to m+1. On the other hand, the value m+2 is inputted to the addition status register 42 by the adder 41. The comparison circuit 33 compares the value m of the interrupt number set register 5 with the value m+2 of the addition status register 42, and outputs a noncoincidence signal. In contrast, the comparison circuit 34 compares the value m of the interrupt number set register 5 with the value m+1 of the FIFO status register 4, and outputs a noncoincidence signal. In both the comparison circuits 33 and 34, the comparison results indicate the noncoincidence. Therefore, the detection result output circuit 36 does not output a detection signal.

When the CPU reads out a transmit data from the FIFO memory 2, the value of the FIFO status register 4 is decreased to m. On the other hand, the value m+1 is inputted to the addition status register 42 by the adder 41. The comparison circuit 33 compares the value m of the interrupt number set register 5 with the value m+1 of the addition status register 42, and outputs a noncoincidence signal. In contrast, the comparison circuit 34 compares the value m of the interrupt number set register 5 with the value m of the FIFO status register 4, and outputs a coincidence signal. Since the comparison result of the comparison circuit 33 indicates the noncoincidence and a flag of the coincidence detection flag circuit 35 is not set, the detection result output circuit 36 does not output a detection signal.

When the CPU further reads out a transmit data from the FIFO memory 2, the value of the FIFO status register 4 is decreased to m−1. On the other hand, the value m is inputted to the addition status register 42 by the adder 41. The comparison circuit 33 compares the value m of the interrupt number set register 5 with the value m of the addition status register 42, and outputs a coincidence signal. In contrast, the comparison circuit 34 compares the value m of the interrupt number set register 5 with the value m−1 of the FIFO status register 4, and outputs a noncoincidence signal. Since the comparison result of the comparison circuit 34 indicates the noncoincidence, however, the detection result output circuit 36 does not output a detection signal.

Even when the CPU further reads out a transmit data from the FIFO memory 2 in the same manner and the value of the FIFO status register 4 reaches the value of the interrupt number set register 5, the detection result output circuit 36 does not again output a detection signal.

As described above, the provision of the means (coincidence detection flag circuit 35) for storing the number of receive data which is greater by one than the number of receive data in the FIFO memory, for comparing the stored number with a predetermined number, and for setting a flag when the numbers coincide with each other allows only the case where the number of transmit data is increased to be detected.

As described above, according to the serial data transfer device of the invention, a predetermined number of data in the FIFO memory is set in the interrupt number set register. Consequently, when the number of residual transmit data (or residual receive data) in the FIFO memory is decreased (or increased) to the specific value, the decrease (or increase) is detected and the interruption to the CPU, or the like occurs. This allows transmit data (or receive data) to be supplied without stopping the transmission transfer or reception transfer, thereby realizing a continuous transfer. Therefore, the invention can attain an effect of improving the reliability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A serial data transfer device for transferring serial data, comprising:
   first storage means for storing a parallel data, for converting the stored parallel data into a serial data, and for moving one bit which is a part of the serial data, for each bit;
   second storage means for storing plural parallel data, and for outputting the stored plural parallel data to said first storage means, in the order in which the parallel data are stored in said second storage means;
   indication means for indicating the number of plural parallel data stored in said second storage means;
   third storage means for storing a predetermined number of parallel data to be stored in said second storage means; and
   comparison means for comparing an indication value of said indication means with a stored value of said third storage means, and for, when the indication value of said indication means is decreased and coincides with the stored value of said third storage means, outputting a coincidence detection signal.

2. A serial data transfer device according to claim 1, wherein said comparison means comprises:
   subtraction means for receiving the indication value of said indication means, and for subtracting one from the indication value;
   fourth storage means for receiving a calculation result of said subtraction means, and for storing the calculation result;
   first comparison means for comparing the stored value of said third storage means with a stored value of said fourth storage means;
   second comparison means for comparing the stored value of said third storage means with the indication value of said indication means;
   fifth storage means for receiving a first comparison result signal outputted from said first comparison means, for delaying the first comparison result signal, and for storing the delayed signal; and signal output means for receiving a second comparison result signal outputted from said second comparison means, and for outputting the second comparison result signal as the coincidence detection signal in accordance with a stored value of said fifth storage means.

3. A serial data transfer device for transferring serial data, comprising:

first storage means for moving one bit which is a part of a serial data, for each bit, for converting the serial data into a parallel data, and for storing the parallel data;

second storage means for receiving plural parallel data from said first storage means, for storing the plural parallel data, and for outputting the stored plural parallel data, in the order in which the parallel data are stored in said second storage means;

indication means for indicating the number of plural parallel data stored in said second storage means;

third storage means for storing a predetermined number of parallel data to be stored in said second storage means; and comparison means for comparing an indication value of said indication means with a stored value of said third storage means, and for, when the indication value of said indication means is increased and coincides with the stored value of said third storage means, outputting a coincidence detection signal.

4. A serial data transfer device according to claim 3, wherein said comparison means comprises:

addition means for receiving the indication value of said indication means, and for adding one to the indication value;

fourth storage means for receiving a calculation result of said addition means, and for storing the calculation result;

first comparison means for comparing the stored value of said third storage means with a stored value of said fourth storage means;

second comparison means for comparing the stored value of said third storage means with the indication value of said indication means;

fifth storage means for receiving a first comparison result signal outputted from said first comparison means, for delaying the first comparison result signal, and for storing the delayed signal; and signal output means for receiving a second comparison result signal outputted from said second comparison means, and for outputting the second comparison result signal as the coincidence detection signal in accordance with a stored value of said fifth storage means.

5. A serial data transfer device for transferring serial data, comprising:

first storage means for storing a parallel data, for converting the stored parallel data into a serial data, and for moving one bit which is a part of the serial data, for each bit;

second storage means for storing plural parallel data, and for outputting the stored plural parallel data to said first storage means, in the order in which the parallel data are stored in said second storage means;

indication means for indicating the number of plural parallel data stored in said second storage means;

third storage means for storing a predetermined number of parallel data to be stored in said second storage means;

comparison means for comparing an indication value of said indication means with a stored value of said third storage means, and for, when the indication value of said indication means coincides with the stored value of said third storage means, outputting a coincidence signal; and signal generation means for receiving the coincidence signal outputted from said comparison means, and for changing a state of signal generation in accordance with the coincidence signal.

6. A serial data transfer device for transferring serial data, comprising:

first storage means for moving one bit which is a part of a serial data, for each bit, for converting the serial data into a parallel data, and for storing the parallel data;

second storage means for receiving plural parallel data from said first storage means, for storing the plural parallel data, and for outputting the stored plural parallel data, in the order in which the parallel data are stored in said second storage means;

indication means for indicating the number of plural parallel data stored in said second storage means;

third storage means for storing a predetermined number of parallel data to be stored in said second storage means;

comparison means for comparing an indication value of said indication means with a stored value of said third storage means, and for, when the indication value of said indication means coincides with the stored value of said third storage means, outputting a coincidence signal; and signal generation means for receiving the coincidence signal outputted from said comparison means, and for changing a state of signal generation in accordance with the coincidence signal.

* * * * *